(No Model.)
F. PETERSON.
TAPER GAGE.
No. 501,807. Patented July 18, 1893.
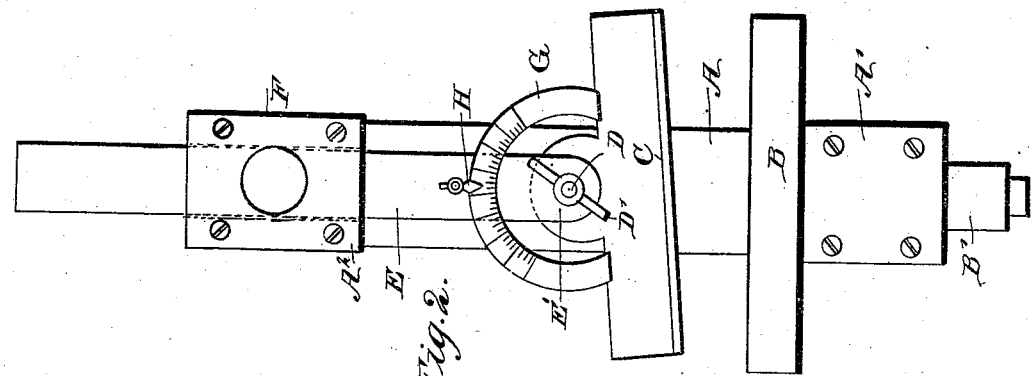
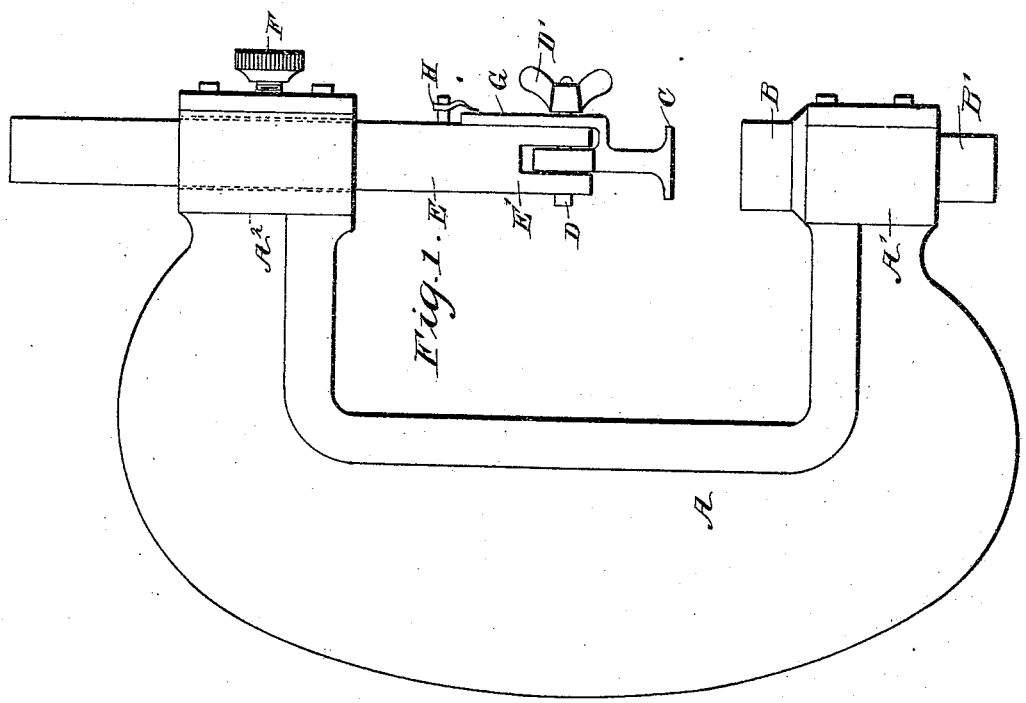
WITNESSES:
INVENTOR
F. Peterson
BY
Munn & Co.
ATTORNEYS.

UNITED STATES PATENT OFFICE.

FRANK PETERSON, OF CHICAGO, ILLINOIS.

TAPER-GAGE.

SPECIFICATION forming part of Letters Patent No. 501,807, dated July 18, 1893.

Application filed April 20, 1893. Serial No. 471,149. (No model.)

*To all whom it may concern:*

Be it known that I, FRANK PETERSON, of Chicago, in the county of Cook and State of Illinois, have invented a new and Improved Taper-Gage, of which the following is a full, clear, and exact description.

The object of the invention is to provide a new and improved gage which is simple and durable in construction, and more especially designed for conveniently and rapidly measuring tapers on work suspended in lathes or other machines.

The invention consists of a table, and a straight edge arranged above the said table and adapted to be swung at angles to the tables.

The invention also consists of certain parts and details and combinations of the same, as will be fully described hereinafter and then pointed out in the claims.

Reference is to be had to the accompanying drawings forming a part of this specification, in which similar letters of reference indicate corresponding parts in both figures.

Figure 1 is a side elevation of the improvement; and Fig. 2 is a front view of the same.

The improved gage is provided with a frame A made approximately U-shaped, and formed at its ends with the bearings A' and A² in alignment with each other, as illustrated in the drawings.

In the bearing A' is held the leg B' of a table B, set on the top of the bearing A', and opposite the table is arranged a straight edge C hung at its middle on a bolt D, arranged in the lower forked end E' of a bar E fitted to slide vertically in the bearing A² and adapted to be secured therein by a set screw F. On the straight edge C is arranged a segment G, the center of which is in the center of the bolt D, and the said segment is provided with a graduation indicating degrees and subdivisions, or the taper per running foot, or other measurement. A pointer H on the bar E indicates on the graduation of the segment G, to enable the operator to conveniently read the taper of the work indicated by the angular position of the straight edge resting on the taper of the work. The wing nut D' of the bolt D serves to clamp the forked end of the bar E to securely hold the straight edge in the desired angular position.

In using the gage on work held in a lathe, for instance, the operator rests the table A against the straight side of the work and then swings the straight edge C on its pivot bolt D, and moves the bar E inward or outward until the straight edge rests properly on the taper of the work. The set screw F is screwed up and likewise the wing nut D', to secure the straight edge in position. The operator has then obtained the taper of the work and can conveniently read the angle of the taper on the graduation of the segment G. It will further be seen that a taper can readily be duplicated by applying the gage to the sample and then to the work in the lathe.

Having thus fully described my invention, I claim as new and desire to secure by Letters Patent—

1. The taper gage composed of a U-shaped frame having aligned bearings at its ends, a table fixed on one arm of the frame, the opposite straight-edge arranged at an angle to the latter; and a bar adapted to slide in the other bearing, and carrying said straight-edge which is pivoted thereon, as shown and described.

2. A taper gage consisting of a frame having two opposite bearings, a table, B, for engaging one side of the work, a straight-edge, C, arranged opposite, a slidable bar on which said straight-edge is pivoted, and a graduated segment, and clamp-screw for securing said segment in different adjustments, or angles, to the table, B, and also nearer or farther from the table, B, as shown and described.

3. A taper gage comprising a frame, a table held on the said frame, a bar held adjustable in the frame over the said table, a straight edge hung on the said bar and adapted to be swung into an angular position relative to the said table, and a graduated segment on the said straight edge, to indicate the angular position of the straight edge, substantially as shown and described.

4. A taper gage comprising a frame, a table held on the said frame, a bar held adjustable in the said frame and having a forked end, a straight edge held in the forked end of the said bar, a bolt for securing the said straight edge in place on the bar, and a graduated segment on the said straight edge, substantially as shown and described.

5. A taper gage comprising a frame, a table held on the said frame, a bar held adjustable in the said frame and having a forked end, a straight edge held in the forked end of the said bar, a bolt for securing the said straight edge in place on the bar, a graduated segment on the said straight edge, and a pointer held on the said bar to indicate on the said graduated segment, substantially as shown and described.

FRANK PETERSON.

Witnesses:
HENRY EASTMAN,
J. A. VAN FLUL.